(12) United States Patent
Vaara

(10) Patent No.: US 11,963,518 B2
(45) Date of Patent: Apr. 23, 2024

(54) SUPERCHARGER FOR FEEDING HONEY AND BEESWAX MIXTURE INTO A HONEY AND BEESWAX SEPARATION SCREW

(71) Applicant: PARADISE HONEY OY, Kerkkoo (FI)

(72) Inventor: Juhani Vaara, Kerkkoo (FI)

(73) Assignee: PARADISE HONEY OY, Kerkkoo (FI)

( * ) Notice: Subject to any disclaimer, the term of this patent is extended or adjusted under 35 U.S.C. 154(b) by 651 days.

(21) Appl. No.: 17/256,604

(22) PCT Filed: Jun. 27, 2019

(86) PCT No.: PCT/FI2019/050509
§ 371 (c)(1),
(2) Date: Dec. 28, 2020

(87) PCT Pub. No.: WO2020/002777
PCT Pub. Date: Jan. 2, 2020

(65) Prior Publication Data
US 2021/0267176 A1    Sep. 2, 2021

(30) Foreign Application Priority Data
Jun. 27, 2018    (FI) .................................. U20180099

(51) Int. Cl.
*A01K 59/04* (2006.01)
*A01K 59/06* (2006.01)
(Continued)

(52) U.S. Cl.
CPC .............. *A01K 59/04* (2013.01); *A01K 59/06* (2013.01); *B01D 29/03* (2013.01); *B01D 36/00* (2013.01); *B30B 9/127* (2013.01); *B30B 9/128* (2013.01)

(58) Field of Classification Search
None
See application file for complete search history.

(56) References Cited

U.S. PATENT DOCUMENTS 1,902,738 A    3/1933   Tuttle
4,453,905 A *  6/1984  Bennett ............... B29B 17/0036
                                                       425/197
(Continued)

FOREIGN PATENT DOCUMENTS

CN    202685342 U    1/2013
CN    204488081      7/2015
(Continued)

OTHER PUBLICATIONS

Extended European Search Report issued in European Patent Application No. 19824448.5 dated Dec. 2, 2021.
(Continued)

*Primary Examiner* — Chester T Barry
(74) *Attorney, Agent, or Firm* — NIXON & VANDERHYE

(57) ABSTRACT

Embodiments of the invention concern a supercharger (1) for feeding honey and beeswax mixture into a honey and beeswax separation screw, which comprises at least a filter pipe (3), a pipe connection fitting (4), an inlet pipe (7) for honey and beeswax mixture and an inlet pipe connection (6) for the honey and beeswax mixture inlet pipe. In an embodied supercharger, the pipe connection fitting (4) is connected radially to the side of the filter pipe (3) and to the other end of the pipe connection fitting is connected the inlet pipe (7) for honey and beeswax mixture using the inlet pipe connection (6) for the honey and beeswax mixture inlet pipe.

7 Claims, 2 Drawing Sheets

(51) Int. Cl.
    *B01D 29/03*     (2006.01)
    *B01D 36/00*     (2006.01)
    *B30B 9/12*     (2006.01)

(56) References Cited

U.S. PATENT DOCUMENTS

| | | |
|---|---|---|
| 4,781,823 A | 11/1988 | Shinozaki |
| 5,715,747 A | 2/1998 | Fedon |
| 8,985,011 B2 | 3/2015 | Klass, Sr. et al. |
| 10,578,112 B2 * | 3/2020 | Aughton ............... G05D 7/00 |
| 2013/0074707 A1 | 3/2013 | Asbury et al. |
| 2015/0191844 A1 * | 7/2015 | Hunter ............... C25D 17/004 |
| | | 205/98 |
| 2016/0298924 A1 * | 10/2016 | Yuen ............... F41B 11/53 |
| 2016/0338325 A1 | 11/2016 | Vaara |
| 2018/0231439 A1 * | 8/2018 | Heller ............... G01N 1/28 |

FOREIGN PATENT DOCUMENTS

| | | |
|---|---|---|
| CN | 204936260 | 1/2016 |
| CN | 206230924 | 6/2017 |
| CN | 107283898 A | 10/2017 |
| FI | 10601 | 8/2014 |
| WO | 83/00306 | 2/1983 |
| WO | 2015/110699 | 7/2015 |

OTHER PUBLICATIONS

International Search Report for PCT/FI2019/050509 dated Aug. 26, 2019, 6 pages.
Written Opinion of the ISA for PCT/FI2019/050509 dated Aug. 26, 2019, 8 pages.

* cited by examiner

SUPERCHARGER FOR FEEDING HONEY AND BEESWAX MIXTURE INTO A HONEY AND BEESWAX SEPARATION SCREW

CROSS-REFERENCE TO RELATED APPLICATIONS

This application is the U.S. national phase of International Application No. PCT/FI2019/050509 filed Jun. 27, 2019 which designated the U.S. and claims priority to FI U20180099 filed Jun. 27, 2018, the entire contents of each of which are hereby incorporated by reference.

TECHNICAL FIELD

The subject of this invention is the separation of honey and beeswax using a honey and beeswax separation screw. For this process a device called honey and beeswax separation screw exists, for which a new device, which replaces the feeding hopper, for supercharging the honey and beeswax mixture into the honey and beeswax separation screw has been invented. This new invention makes it possible to increase the honey and beeswax mixture processing capacity of a honey and beeswax separation screw remarkably, up to tens of percent, by replacing the traditional open feeding hopper with a closed supercharger according to this invention.

BACKGROUND AND KNOWN TECHNOLOGY

Traditionally the honey and beeswax mixture is fed into the honey and beeswax separation screw by pouring honey and beeswax mixture into a feed hopper, which is open from above and usually connected to the first portion of filter tube of the honey and beeswax separation screw. The problem with this traditional feed hopper is that honey and beeswax mixture is fed into the honey and beeswax separation screw by gravitation with a speed, which can be adjusted slightly by pouring the feed hopper as full of honey and beeswax mixture as possible and increasing the rotation speed of the threaded main shaft of the honey and beeswax separation screw, which is usually equipped with an electric gear motor, so that the separation result is still adequate. If this threaded main shaft of the honey and beeswax separation screw is rotated in too high rotational speed, the separation result of the honey and beeswax separation screw becomes worse. In other words then the amount of honey left in the separated beeswax increases and in addition the threaded main shaft starts to repel the mixture so that even if the feed hopper is full of honey and beeswax mixture, the space for the honey and beeswax mixture in the threads of the threaded main shaft is not filling up completely even though there would be space available for the mixture.

In addition to the increase of honey content in the separated beeswax and the repelling of the mixture in the threads of the rotating threaded main shaft, another problem, which restricts the increasing of the processing capacity of the honey and beeswax separation screw, is that while feeding the honey and beeswax separation screw with the help of gravity, through the opening of the first portion of the filter pipe the honey and beeswax mixture passes through to be moved forward inside the threads of the threaded main shaft at a speed which is limited by gravity, which speed also depends for instance on the shape of the thread of the threaded main shaft, rotational speed of the threaded main shaft, type of honey being processed and also the size and shape of the aperture in the first portion of the filter pipe which aperture connects the filter pipe with the feed hopper.

For clarification it is mentioned that a traditional honey and beeswax separation screw means for instance a device shown in a Finnish utility model number 10601.

SUMMARY OF THE INVENTION

The aim of this invention is a supercharger for feeding honey and beeswax mixture into a honey and beeswax separation screw, which makes it possible to feed honey and beeswax mixture into a honey and beeswax separation screw in a closed space under a controlled pressure and thus increase remarkably the processing capacity of the honey and beeswax separation screw. In addition, the supercharger for feeding honey and beeswax mixture into a honey and beeswax separation screw is easy to equip with a trash pre-filter, which prevents trash in the honey and beeswax mixture entering the honey and beeswax separation screw, which trash should not enter the honey and beeswax separation screw. Trash means in this context for instance parts of broken honeycomb frames and for instance screws loose from honeycomb frames, nails or wires, which when entering the honey and beeswax separation screw will damage or even break down the honey and beeswax separation screw.

In addition, a honey and beeswax separation screw equipped with the new supercharger for feeding honey and beeswax into a honey and beeswax separation screw does not require constant operator's supervising and it is more hygienic than a honey and beeswax separation screw equipped with a traditional feed hopper. And in addition, the supercharger for feeding honey and beeswax mixture into a honey and beeswax separation screw is remarkably more safe for the operator, because it does not have a direct access to the moving parts of the honey and beeswax separation screw and thus for instance putting a hand by accident inside the honey and beeswax separation screw through the supercharger is not possible, which in the case of the traditional feed hopper is possible.

The supercharger for feeding honey and beeswax into a honey and beeswax separation screw is also remarkably more compact and more cheap to manufacture than the traditional feed hopper and the use of the supercharger for feeding honey and beeswax into a honey and beeswax separation screw makes it possible to feed the honey and beeswax separation screw from other direction than above the filter pipe (for instance from the side or underneath in the case there is not enough space above the filter pipe or the height of the structure is desired to be as low as possible).

The honey and beeswax mixture is fed under a pressure created by a honey pump, so the direction of feeding does not matter remarkably in regards to the functioning of a device utilizing the invention. For this reason, the supercharger for feeding honey and beeswax into a honey and beeswax separation screw is outstandingly suitable to be used in addition to the traditional honey and beeswax separation screw also in a vertical honey and beeswax separation device in which the beeswax separation is implemented in vertical direction unlike in the traditional honey and beeswax separation screw.

For clarification it is mentioned that a vertical honey and beeswax separation device means a device according to Finnish utility model number 11762.

BRIEF DESCRIPTION OF DRAWINGS

Next, the invention is explained more in detail with the help of beneficial implementation examples referring to the accompanying drawings, where in.

DETAILED DESCRIPTION OF INVENTION

Figure 1:
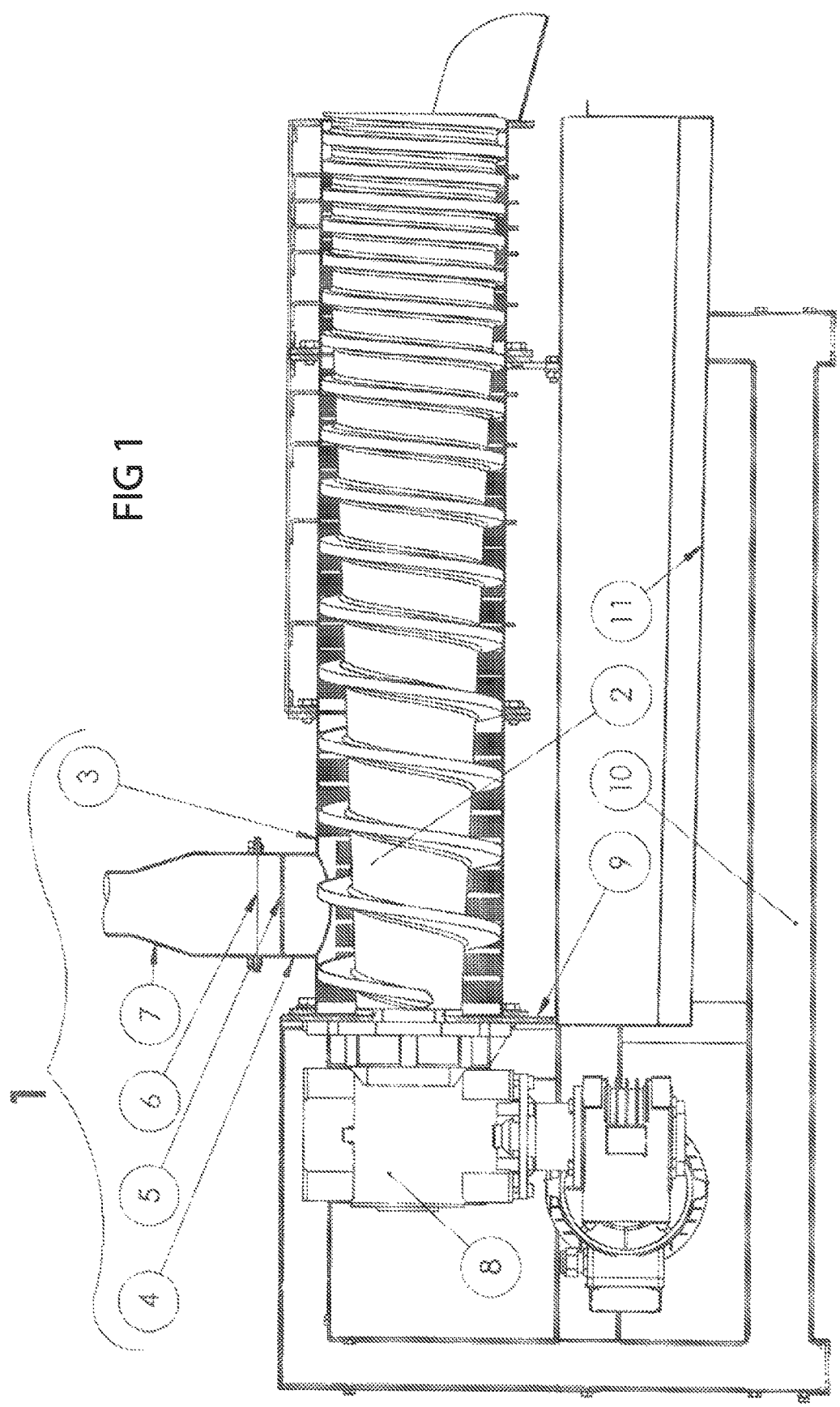
FIG. 1: Drawing of a side view of partially sectioned honey and beeswax separation screw, which is equipped with a supercharger for feeding honey and beeswax into a honey and beeswax separation screw according to the invention, which is installed in the example of FIG. 1 to the first portion of the filter pipe above the threaded main shaft and filter pipe.

A supercharger for feeding honey and beeswax into a honey and beeswax separation screw 1 shown in the drawing FIG. 1, which is according to the invention, consists at least of a filter pipe 3, inside which a threaded main shaft 2 is slowly rotating the with the help of a gear motor 8 or some other power source, a connection pipe fitting 4, which is connected to the side of the filter pipe 3 in the direction of the radius of the filter pipe 3, and an inlet pipe for honey and beeswax mixture 7, which is connected to the connection pipe fitting 4, and an inlet pipe connection for the honey and beeswax mixture inlet pipe 6. The filter pipe 3 has an aperture where the connection pipe fitting 4 is connected to the filter pipe 3.

The filter pipe 3 can be assembled using one or more cylindrical components. The cylindrical components can be each assembled using several components which can be achieved for instance by splitting a said cylindrical component in two or more components in the direction of the longitudinal axis of the cylindrical component. In a beneficial implementation example of the invention shown in drawing FIG. 1 the electric gear motor 8, which rotates the threaded main shaft 2, and the filter pipe 3 is fastened to a base frame 9 using bolts and the base frame 9 is fastened using bolts to a lower base frame 10, but a professional in this field understands based on the implementation examples of the invention that a supercharger for feeding honey and beeswax into a honey and beeswax separation screw 1 according to the invention can be used also in the case of some different fastening arrangement of the filter pipe 3 and the electric gear motor 8. The example of a beeswax separation screw shown in drawing FIG. 1 is also equipped with a honey tank 11, into which clean and filtered honey drains from the holes of the filter pipe 3.

In addition, one beneficial implementation example of the invention is equipped with a trash pre-filter as shown in the drawing FIG. 1: Before the inlet pipe connection for the honey and beeswax mixture inlet pipe 6, inside the connection pipe fitting 4 is fastened a filter plate 5 which is equipped with apertures, through which the pieces of wood and other similar size trash do not fit preventing the trash entering inside the honey and beeswax separation screw. This way the trash in the honey and beeswax mixture will be left on one side of the filter plate 5 and the trash can be removed by opening the inlet pipe connection for the honey and beeswax mixture inlet pipe 6 and for instance with the help of a scoop-like tool to scoop the trash out and after that to close the inlet pipe connection for the honey and beeswax mixture inlet pipe 6.

The supercharger for feeding honey and beeswax into a honey and beeswax separation screw 1 can be also equipped with a separate tightly closed service opening or service hatch through which the trash filtered by the trash pre-filter can be conveniently removed (the service hatch or service opening is not shown in FIG. 1). The filter plate 5 which is shown in the beneficial embodiment example of the invention shown in the drawing FIG. 1, is equipped with oval shaped holes, but off course the holes could have some different shape and also the filter plate 5 could be assembled using multiple components.

The filter plate 5, which is shown in the beneficial embodiment example of the invention shown in accompanying drawing FIG. 1, is installed by welding it in place inside the connection pipe fitting 4. Off course the filter plate 5 can be fastened also using bolts or some other fastening means inside the connection pipe fitting 4 and also the filter plate 5 can be positioned to some other location than shown in the example of drawing FIG. 1, for instance inside the inlet pipe for honey and beeswax mixture 7. Although this way implemented, the inlet pipe for honey and beeswax mixture 7 needs a separate service aperture or service hatch so that the trash can be removed from inside the inlet pipe for honey and beeswax mixture 7.

In the embodiment example of the invention shown in drawing FIG. 1, connection pipe fitting 4 and the inlet pipe for honey and beeswax mixture 7 are connected to each other tightly using flanges which are fastened against each other using bolts. Surely also for instance a tight threaded or some other fast connection type are suitable for this connection. In addition, in the accompanying beneficial embodiment examples the pipe connection fitting 4 and thus also the filter plate 5 are cross-sectionally round, but off course the connection pipe fitting 4 and thus also the filter plate 5 can be implemented to have some other cross-sectional shape, for instance, square or rectangular.

Figure 2:
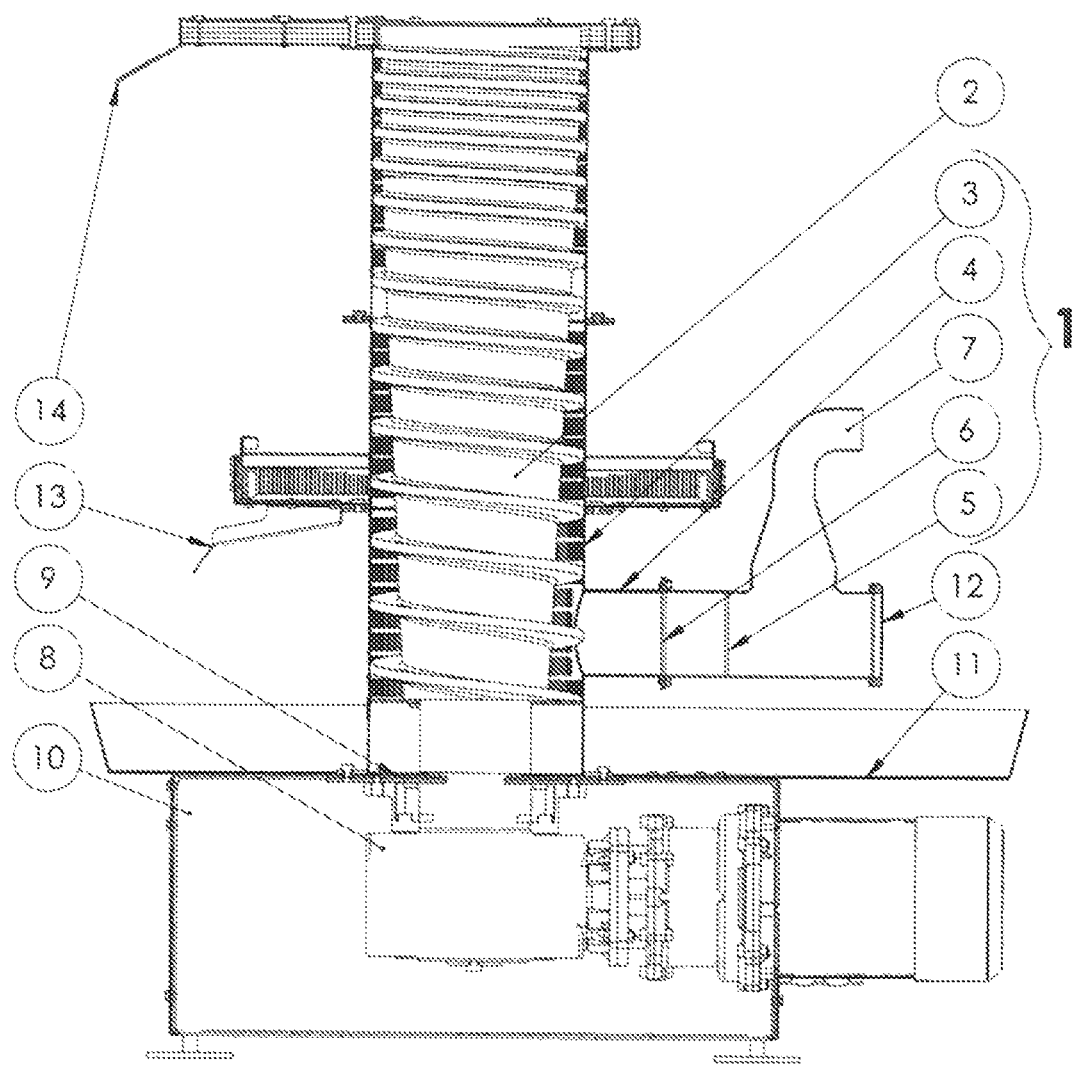
FIG. 2: Drawing of a Side view of partially sectioned vertical honey and beeswax separation device, which is equipped with the supercharger for feeding honey and beeswax into a honey and beeswax separation screw according to the invention, which is installed in the example of FIG. 2 in the lower end of the filter pipe due to the example of a vertical honey and beeswax separation device shown in FIG. 2 being implemented to separate from down upwards. This means that the honey and beeswax mixture move inside the filter pipe upwards from the lower end of the filter pipe and while moving upwards it is under pressure and the beeswax percentage increases, because when under pressure some honey from the honey and beeswax mixture is continuously pressed out from the holes of the filter pipe.

The connection of the pipe connection fitting 4 to the filter pipe 3 radially means that the pipe connection fitting 4 is connected to the side of the filter pipe 3 and the connection area is open, but off course a professional in this field understands based on the embodiment examples of the invention that in practice the connection angle of connection pipe fitting 4 and the filter pipe 3 can be easily different than the angle shown in the examples of FIG. 1 and FIG. 2 even though the angle is about 90 degrees in both examples. For example, the supercharger 1 according to the invention functions outstandingly even if the said connection angle would be in the example shown in FIG. 1 about 60 degrees, 45 degrees or, for instance, 30 degrees forward, to the side or backward or in the example of FIG. 2 correspondingly downward, to the side or upward or if the connection angle is a combination of any of the mentioned angles.

The inlet pipe for honey and beeswax mixture 7 means in the most simple case scenario a pipe, to whose other end is connected a honey pump or some other member which generates pressure for the honey and beeswax mixture, which is implemented so that the member pumps honey and beeswax mixture while the device is operating to a honey and beeswax separation screw or to a vertical honey and beeswax separation device for instance from a honey and beeswax mixture pre-stirrer tank or for instance from an ordinary honey tank containing honey and beeswax mixture produced by extracting honeycomb frames.

In the beneficial embodiment example of the invention, which is shown in drawing FIG. 2, the supercharger for feeding honey and beeswax into a honey and beeswax separation screw 1 is installed to the lower end of the filter pipe 3 due to that the vertical honey and beeswax separation device shown in the drawing FIG. 2 is implemented so that it functions from lower end upwards which means that the honey and beeswax mixture move inside the filter pipe 3 upwards inside the threads of the threaded main shaft 2. Based on the embodiment example of the invention, a professional in this field understands that the supercharger for feeding honey and beeswax mixture into a honey and beeswax separation screw 1 is suitable outstandingly to be installed also to a vertical honey and beeswax separation device which functions from upper end downwards. Although in that case the supercharger for feeding honey and beeswax into a honey and beeswax separation screw 1 is installed to the upper end of the filter pipe 3 radially in the direction of the radius of the filter pipe 3.

In the example shown in drawing FIG. 2 is presented a service hole 12 of the supercharger for feeding honey and beeswax mixture into a honey and beeswax separation screw 1, which is in the example of FIG. 2 opened and closed tightly by hand using a pipe closure fitting. In the example of FIG. 2 the trash is left on one side of the filter plate 5 inside a portion of the horizontally aligned inlet pipe for honey and beeswax mixture 7 and through the service hole 12 located in the other end of this part it is easy to scoop the trash out.

The functioning of the device shown in drawing FIG. 2 differs remarkably from the device shown in FIG. 1, like honey draining from the pre-filter tray along a special honey guider member 13 to a honey tank 11 and dry beeswax comes out from the device from the upper end of the filter pipe 3 along a wax guider member 14. Another difference in the examples of drawings FIG. 1 and FIG. 2 relating to the supercharger for feeding honey and beeswax mixture into a honey and beeswax separation screw 1 is that in example of drawing FIG. 2 the pipe connection fitting 4 is aligned horizontally or almost horizontally in regards to the gravity field and in example of drawing FIG. 1 it is aligned vertically.

In the example of drawing FIG. 2 also the filter pipe 3 and electric gear motor 8 is fastened using bolts to the base frame 9 and the base frame 9 is fastened using bolts to the lower base frame 10, but a professional in this field understands based on the implementation examples of the invention that the supercharger for feeding honey and beeswax mixture into a honey and beeswax separation screw 1, which is according to the invention, can be used also if the fastening arrangement of the filter pipe 3 and electric gear motor 8 is different from this shown fastening arrangement also in the case of the vertical honey and beeswax separation device.

In the accompanying embodiment examples of the invention the pipe connection fitting 4 is connected to the filter pipe 3 by welding, but off course this connection can be implemented in some other way. In addition, in the accompanying example of drawing FIG. 2 the service hole 12 is cross-sectionally round and it is closeable using a round disc-like part and is closed tightly using a fast connector of a pipe connector fitting. Off course this closing of the service hole and opening the service hole and tightly installing in place can be implemented using some other arrangement, for instance a hinged latch.

The invention claimed is:

1. A supercharger for feeding a honey and beeswax mixture into a honey and beeswax separation screw (1), the supercharger comprising:
   a filter pipe (3),
   a pipe connection fitting (4) having a first end and a second end, the first end of the pipe connection fitting (4) connected radially to a side of the filter pipe (3),
   an inlet pipe (7) for the honey and beeswax mixture, the inlet pipe (7) having a first end connected to a honey pump, and
   a pipe connection (6) having a first end connecting to a second end of the inlet pipe (7) and a second end connected to the pipe connection fitting (4),
   wherein the honey pump generates pressure for the honey and beeswax mixture within the inlet pipe (7), so that, while the supercharger is operating, the honey pump pumps the honey and beeswax mixture to the honey and beeswax separation screw (1).

2. The supercharger for feeding honey and beeswax mixture into a honey and beeswax separation screw (1) according to claim 1, further comprising a trash pre-filter comprised of a filter plate (5) fastened inside the pipe connection fitting (4).

3. The supercharger for feeding honey and beeswax mixture into a honey and beeswax separation screw (1) according to claim 2, wherein the inlet pipe (7) further comprises one of a service hole (12) and an openable service hatch for cleaning trash out from the trash pre-filter and for cleaning the trash pre-filter.

4. The supercharger for feeding honey and beeswax mixture into a honey and beeswax separation screw (1) according to claim 1, further comprising a trash pre-filter comprised of a filter plate (5) fastened inside the inlet pipe (7).

5. The supercharger for feeding honey and beeswax mixture into a honey and beeswax separation screw (1) according to claim 4, further comprising one of a service hole and an openable service hatch for cleaning trash out from the trash pre-filter and for cleaning the trash pre-filter.

6. The supercharger for feeding honey and beeswax mixture into a honey and beeswax separation screw (1) according to claim 2, wherein the inlet pipe (7) has a third end defining a service hole (12) for cleaning trash out from the trash pre-filter and for cleaning the trash pre-filter, and further comprising an openable part that opens and closes the service hole (12).

7. The supercharger for feeding honey and beeswax mixture into a honey and beeswax separation screw (1) according to claim 4, wherein the inlet pipe (7) has a third end defining a service hole (12) for cleaning trash out from the trash pre-filter and for cleaning the trash pre-filter, and further comprising an openable part that opens and closes the service hole (12).

\* \* \* \* \*